(12) United States Patent
Li

(10) Patent No.: US 8,783,700 B2
(45) Date of Patent: Jul. 22, 2014

(54) STROLLER WHEEL DEVICE

(75) Inventor: Dao-Chang Li, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 13/590,087

(22) Filed: Aug. 20, 2012

(65) Prior Publication Data

US 2013/0069334 A1    Mar. 21, 2013

(30) Foreign Application Priority Data

Sep. 15, 2011    (CN) .......................... 2011 1 0275156

(51) Int. Cl.
*B60G 3/02* (2006.01)
*B60B 3/00* (2006.01)
*B62B 9/18* (2006.01)
*B60B 33/04* (2006.01)

(52) U.S. Cl.
CPC ... *B60G 3/02* (2013.01); *B62B 9/18* (2013.01); *B62B 2301/20* (2013.01); *B60B 33/045* (2013.01); *B60B 3/001* (2013.01)
USPC .............. 280/124.128; 280/124.13

(58) Field of Classification Search
CPC .............. B60G 3/02; B60G 3/14; B60G 3/04; B60G 3/06; B60G 3/12; B60G 2202/12; B60G 2204/30; B60G 2300/22; B60B 33/045
USPC ...................... 280/124.128, 124.13, 124.129, 280/124.132, 5.2; 16/28, 34
See application file for complete search history.

(56) References Cited

U.S. PATENT DOCUMENTS

| 2,738,542 | A | * | 3/1956 | Clark, Jr. ........................... 16/44 |
| 3,174,176 | A | * | 3/1965 | Olson ........................... 16/35 R |
| 4,447,073 | A | * | 5/1984 | Brandstadter .......... 280/124.129 |
| 5,855,518 | A | * | 1/1999 | Tanaka et al. .................... 464/38 |
| 6,234,507 | B1 | * | 5/2001 | Dickie et al. ................ 280/304.1 |
| 6,739,607 | B2 | * | 5/2004 | Eriksson et al. ........ 280/124.129 |
| 6,776,428 | B2 | * | 8/2004 | Strong .................... 280/124.128 |
| 6,789,810 | B2 | * | 9/2004 | Strong .................... 280/124.128 |

(Continued)

FOREIGN PATENT DOCUMENTS

| CN | 2717730 | Y | 8/2005 |
| CN | 2801586 | Y | 8/2006 |
| CN | 201186720 | Y | 1/2009 |
| EP | 1700770 | B1 | 2/2006 |

OTHER PUBLICATIONS

English Abstract of CN 201186720Y, 2009.
English Abstract of CN 2717730Y, 2005.

(Continued)

*Primary Examiner* — Drew Brown
(74) *Attorney, Agent, or Firm* — Allston L. Jones; Peters Verny, LLP

(57) ABSTRACT

A stroller wheel device includes a wheel, a frame-connecting member, a wheel-connecting arm, and a resilient member. The frame-connecting member includes at least one first pressing portion. The wheel-connecting arm includes upper and lower ends connected respectively and pivotally to the frame-connecting member and the wheel, and at least one second pressing portion spaced apart from the first pressing portion. The resilient member is disposed between and abuts against the first and second pressing portions. When the wheel-connecting arm rotates relative to the frame-connecting member, the first and second pressing portions move toward each other to compress the resilient member.

24 Claims, 13 Drawing Sheets

(56) References Cited

U.S. PATENT DOCUMENTS

| | | | |
|---|---|---|---|
| 6,892,421 B2 * | 5/2005 | Cooper et al. | 16/44 |
| 7,497,449 B2 | 3/2009 | Logger | |
| 8,186,697 B2 * | 5/2012 | Stephenson et al. | 280/124.166 |
| 2008/0007022 A1 * | 1/2008 | Jones | 280/124.13 |
| 2008/0116660 A1 | 5/2008 | Nicholls | |
| 2009/0152828 A1 * | 6/2009 | Bebernes et al. | 280/86 |

OTHER PUBLICATIONS

English Abstract of CN 2801586Y, 2006.

\* cited by examiner

STROLLER WHEEL DEVICE

CROSS-REFERENCE TO RELATED APPLICATION

This application claims priority of Chinese Application No. 201110275156.7, filed on Sep. 15, 2011.

BACKGROUND OF THE INVENTION

1. Field of the Invention

This invention relates to a stroller, and more particularly to a stroller wheel device including a shock-absorbing mechanism.

2. Description of the Related Art

A conventional stroller is provided with a shock-absorbing mechanism for absorbing shock of wheels during traveling of the stroller on uneven road surfaces, thereby facilitating smooth movement of the stroller. However, existing shock-absorbing mechanisms have complicated structures, which lead to an increase in the manufacturing costs of the stroller.

SUMMARY OF THE INVENTION

The object of this invention is to provide a stroller wheel device including a shock-absorbing mechanism that has a simple structure and that can facilitate effectively smooth movement of the stroller.

According to this invention, there is provided a stroller wheel device comprising:

a wheel;

a frame-connecting member including at least one first pressing portion;

a wheel-connecting arm including upper and lower ends connected respectively and pivotally to the frame-connecting member and the wheel, and at least one second pressing portion spaced apart from the first pressing portion; and a resilient member disposed between and abutting against the first and second pressing portions such that, when the wheel-connecting arm rotates relative to the frame-connecting member, the first and second pressing portions move toward each other to compress the resilient member.

As such, the resilient member cooperates with the first and second pressing portions to constitute a shock-absorbing mechanism, which is simple in structure and which can absorb effectively shock of the wheel.

BRIEF DESCRIPTION OF THE DRAWINGS

These and other features and advantages of this invention will become apparent in the following detailed description of three preferred embodiments of this invention, with reference to the accompanying drawings, in which.

DETAILED DESCRIPTION OF THE PREFERRED EMBODIMENTS

Figure 1:
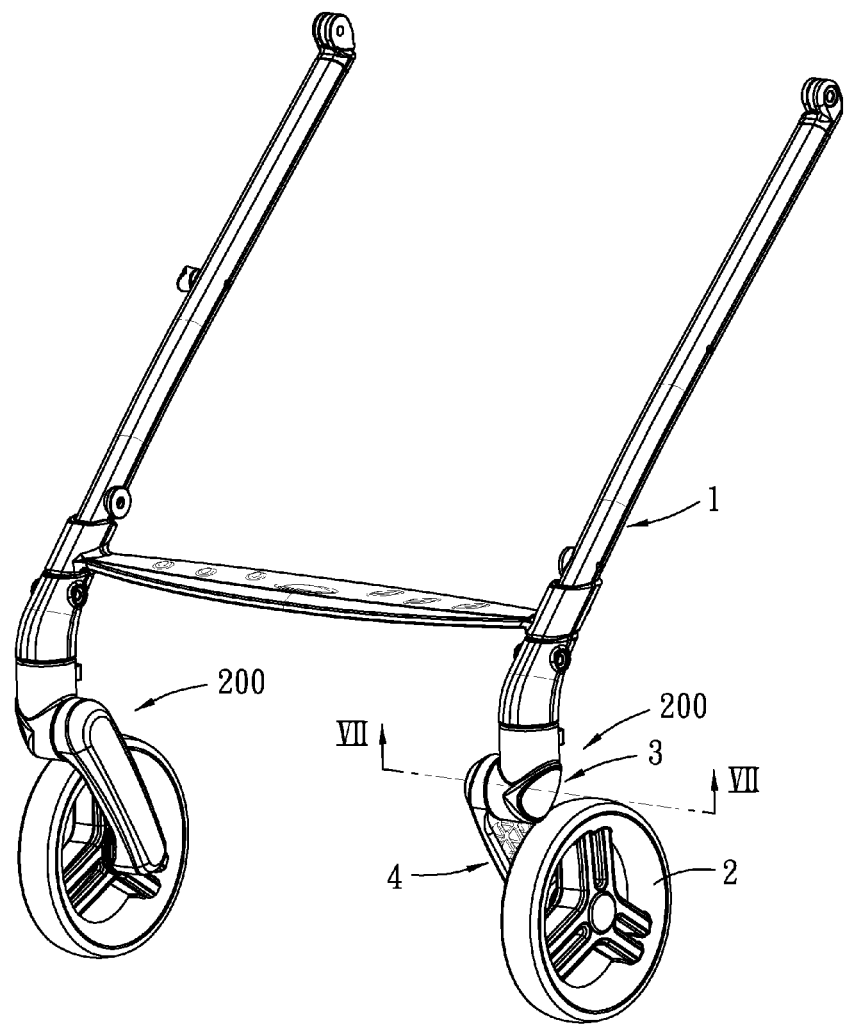
FIG. 1 is a fragmentary perspective view of a stroller including the first preferred embodiment of a stroller wheel device according to this invention.

Before the present invention is described in greater detail in connection with the preferred embodiments, it should be noted that similar elements and structures are designated by like reference numerals throughout the entire disclosure.

Referring to FIG. 1, the preferred embodiment of a stroller wheel device 200 according to this invention is mounted to a stroller frame 1.

Figure 2:
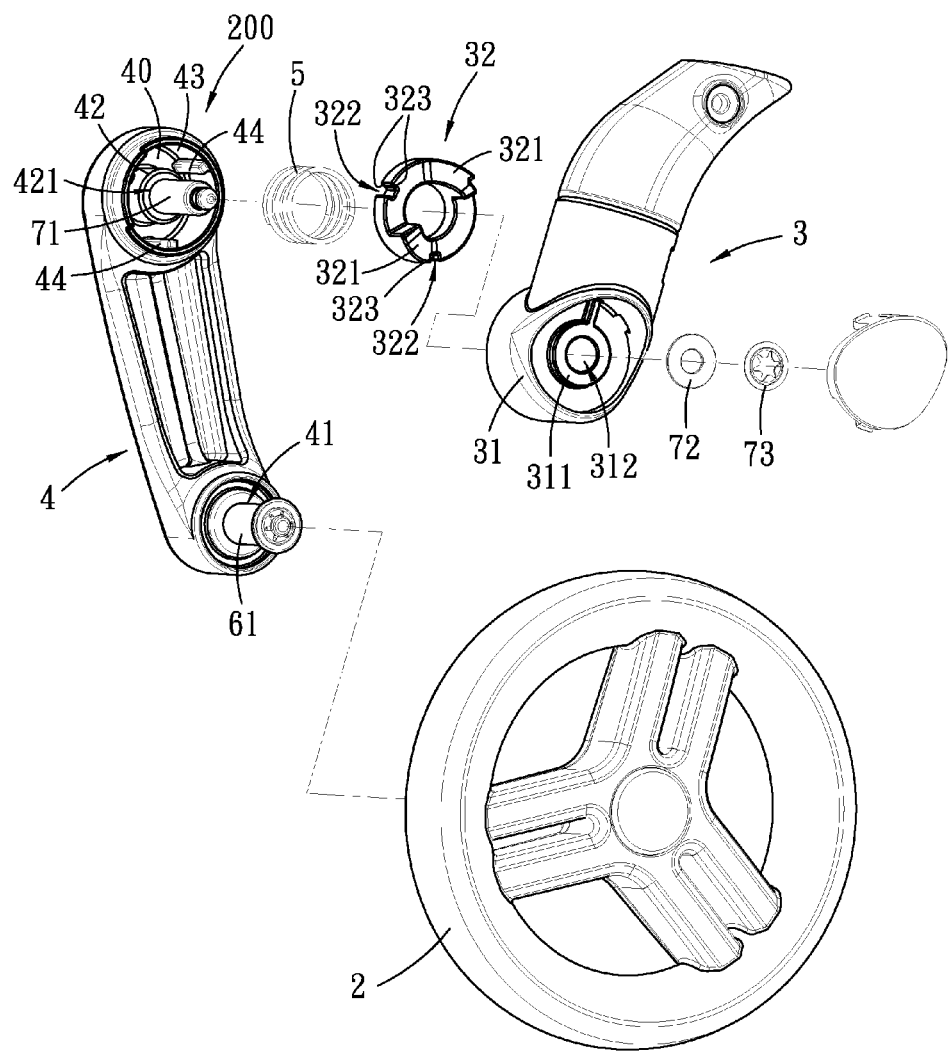
FIG. 2 is an exploded perspective view of the first preferred embodiment.
Figure 3:
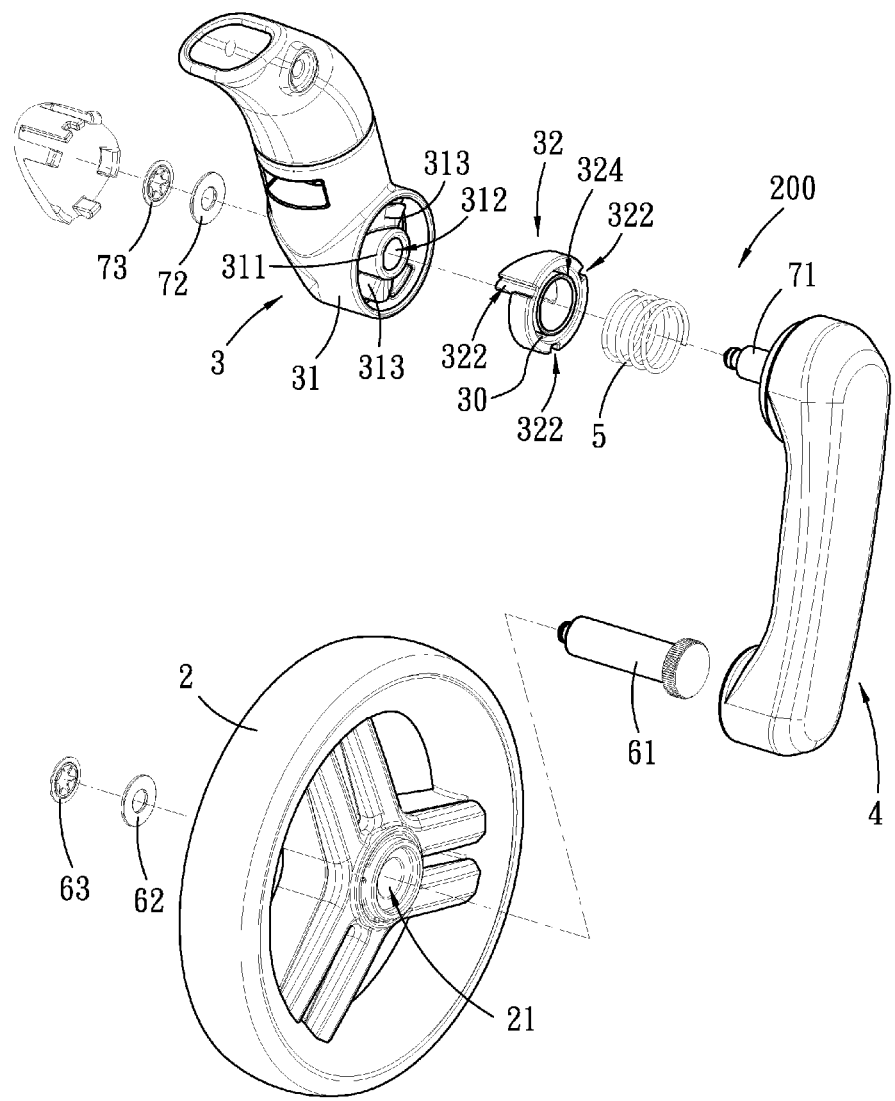
FIG. 3 is another exploded perspective view of the first preferred embodiment, viewed from a different angle.

With further reference to FIGS. 2 and 3, the stroller wheel device 200 includes a wheel 2, a frame-connecting member 3, and a wheel-connecting arm 4. The wheel-connecting arm 4 includes upper and lower ends connected respectively and pivotally to the frame-connecting member 3 and the wheel 2. The frame-connecting member 3 includes at least one first pressing portion 30. The wheel-connecting arm 4 includes at least one second pressing portion 40 spaced apart from the first pressing portion 30. The stroller wheel device 200 further includes at least one resilient member 5 disposed between and abutting against the first and second pressing portions 30, 40. When the wheel 2 moves on an uneven road surface so that the wheel-connecting arm 4 is driven by the wheel 2 to rotate relative to the frame-connecting member 3, the first and second pressing portions 30, 40 move toward each other to compress the resilient member 5. In this manner, shock of the wheel 2 can be absorbed by the resilient member 5 to facilitate smooth movement of the stroller.

Structure and operation of the stroller wheel device 200 will be described in the following.

A lower pivot 61 of the stroller wheel device 200 is inserted fixedly into a lower coupling hole 41 in a lower end of the wheel-connecting arm 4 at one end thereof, and extends through a pivot hole 21 in the wheel 2 at the other end thereof. A washer 62 is sleeved on an end portion of the lower pivot 61 extending outwardly from the pivot hole 21, and abuts against the wheel 2. A retaining ring 63 is sleeved fixedly on the lower pivot 61 in a tongue and groove engaging manner, and abuts against the washer 62. As such, the wheel 2 is rotatable relative to the wheel-connecting arm 4 and about the axis of the lower pivot 61. In this embodiment, the wheel-connecting arm 4 has an upper end formed with a hollow cylinder, which includes the second pressing portion 40 and a surrounding wall 43 extending from an outer periphery of the second pressing portion 40. The second pressing portion 40 is configured as an end wall of the hollow cylinder. The wheel-connecting arm 4 further includes a projecting rod 42 projecting from a central portion of the second pressing portion 40. The surrounding wall 43 is disposed around the projecting rod 42. An assembly of the second pressing portion 40 and the projecting rod 42 is formed with an upper coupling hole 421. The frame-connecting member 3 includes a sleeve 31 configured as a hollow cylinder and formed with a pivot rod 311 having a pivot hole 312 aligned with the upper coupling hole 421. An upper pivot 71 of the stroller wheel device 200 is inserted fixedly into the upper coupling hole 421 at one end thereof, and extends through the pivot hole 312 in the sleeve 31 at the other end thereof. A washer 72 is sleeved on an end portion of the upper pivot 71 extending outwardly from the pivot hole 312, and abuts against the pivot rod 311. A retaining ring 73 is sleeved fixedly on the upper pivot 71 in a tongue and groove engaging manner, and abuts against the washer 72. In this manner, the wheel-connecting member 4 is rotatable relative to the sleeve 31 and about the axis of the upper pivot 71.

The frame-connecting member 3 further includes a pressing ring 32 sleeved on the projecting rod 42 of the wheel-connecting arm 4. The pressing ring 32 includes the first pressing portion 30 at an end thereof facing the second pressing portion 40, and can be driven by the wheel-connecting arm 4 to rotate to thereby be pushed by the sleeve 31 to move along an axial direction of the projecting rod 42, so as to compress the resilient member 5. One of an end of the pressing ring 32 opposite to the first pressing portion 30 and an end of the sleeve 31 facing the pressing ring 32 is formed with at least one spiral surface 321, 313, and the other of the end of the pressing ring 32 opposite to the first pressing portion 30 and the end of the sleeve 31 facing the pressing ring 32 is biased to contact the spiral surface 321, 313. When the pressing ring 32 is rotated by the wheel-connecting arm 4, in the case where the spiral surface 321 is formed on the pressing ring 32, the sleeve 31 comes into contact with the spiral surface 321 to move the pressing ring 32 along the projecting rod 42 to thereby compress the resilient member 5; and in the case where the spiral surface 313 is formed on the sleeve 31, the pressing ring 32 comes into contact with the spiral surface 313 to move along the projecting rod 42 to thereby compress the resilient member 5.

In this embodiment, an end of the pressing ring 32 opposite to the first pressing portion 30 is formed with two diametrically opposed first spiral surfaces 321, and the sleeve 31 has two second spiral surfaces 313 formed on an outer peripheral surface of the pivot rod 311 and facing and abutting against the first spiral surfaces 321, respectively. Since the first spiral surfaces 321 abut respectively the second spiral surfaces 313, when the pressing ring 32 is rotated, the second spiral surfaces 313 push the first spiral surfaces 321 to move along the projecting rod 42. Alternatively, the number of the first and second spiral surfaces 321, 313 may be changed.

Figure 4:
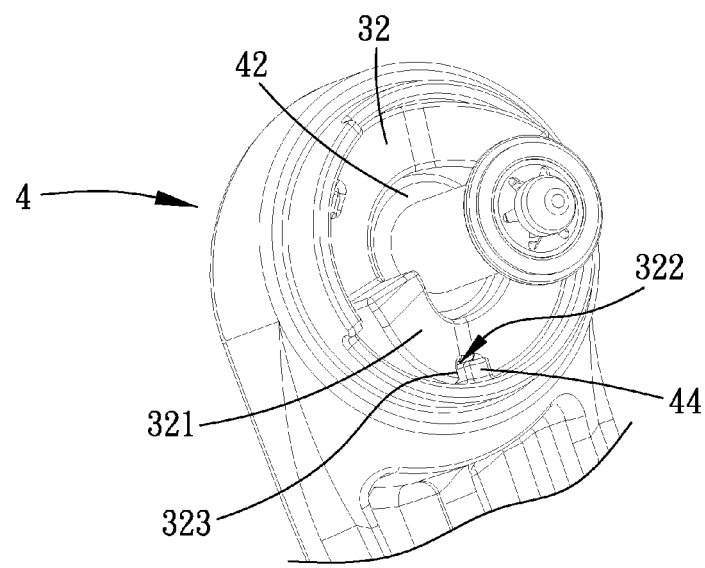
FIG. 4 is an enlarged view of a portion of FIG. 2.

With further reference to FIG. 4, the wheel-connecting arm 4 further includes a plurality of first engaging portions 44. The pressing ring 32 further includes a plurality of second engaging portions 322 that engage respectively the first engaging portions 44, such that the pressing ring 32 can be driven by the wheel-connecting arm 4 to rotate. In this embodiment, each of the first engaging portions 44 is configured as a rib extending from an inner wall surface of the surrounding wall 43 and extending in a direction parallel to the projecting rod 42. Each of the second engaging portions 322 is configured as an engaging groove that is formed in an outer periphery (i.e., outer peripheral surface) of the pressing ring 32 and that has two opposite open axial ends 323. The rib 44 extends through the engaging groove 322 so that, when the wheel-connecting arm 4 rotates, it drives rotation of the pressing ring 32. As such, each of the second engaging portions 322 can move along a longitudinal direction of the corresponding first engaging portion 44. Alternatively, the number of the first and second engaging portions 44, 322 may be changed. For example, the wheel-connecting arm 4 includes only one first engaging portion 44, and the pressing ring 32 includes only one second engaging portion 322.

In one alternative arrangement, the first engaging portions 44 are disposed at an annular outer surface of the projecting rod 42, and the second engaging portions 322 are disposed at an inner peripheral surface of the pressing ring 32. In another alternative arrangement, the first engaging portions are configured as engaging grooves formed in an inner wall surface of the surrounding wall 43, and second engaging portions are ribs extending from an outer peripheral surface of the pressing ring 32.

Since the first spiral surfaces 321 of the pressing ring 32 abut respectively against the second spiral surfaces 313 of the sleeve 31, and since the second engaging portions 322 of the pressing ring 32 engage respectively the first engaging portions 44, when the wheel-connecting arm 4 is rotated relative to the sleeve 31 to rotate the pressing ring 32, the pressing ring 32 can be pushed by the sleeve 31 to move along an axial direction of the projecting rod 42 to thereby compress the resilient member 5.

With particular reference to FIGS. 2 and 3, the resilient member 5 is a compression spring disposed between the pressing ring 32 and the wheel-connecting arm 4, sleeved on the projecting rod 42, and having two ends abutting respectively against the first pressing portion 322 of the engaging ring 32 and the second pressing portion 40 of the wheel-connecting member 4. Due to the biasing action of the resilient member 5, the first spiral surfaces 321 of the pressing ring 32 are biased to contact the second spiral surfaces 313 of the sleeve 31. In this embodiment, the pressing ring 32 is formed with an annular groove 324 for receiving an end of the resilient member 5. The first pressing portion 30 acts as a bottom wall surface defining the annular groove 324.

Figure 5:
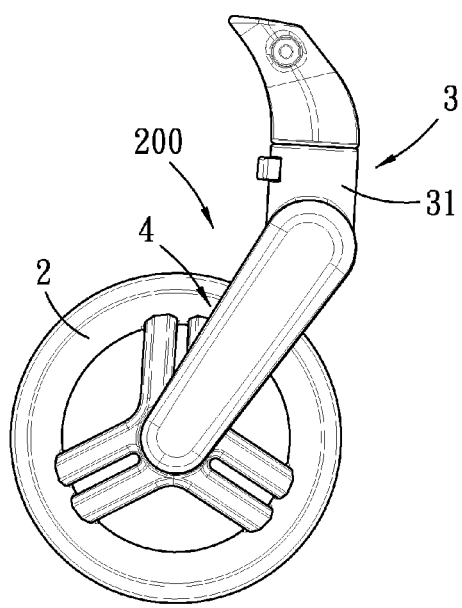
FIG. 5 is a side view of the first preferred embodiment.
Figure 6:
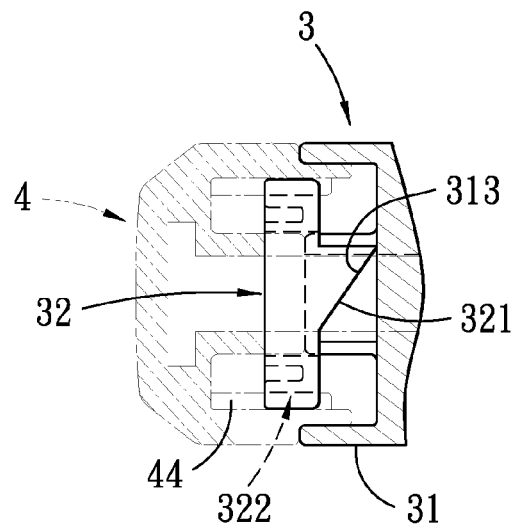
FIG. 6 is a schematic sectional view of the first preferred embodiment, illustrating that a pressing ring is spaced apart from a second pressing portion at a distance during traveling of the stroller on a flat road surface.
Figure 7:
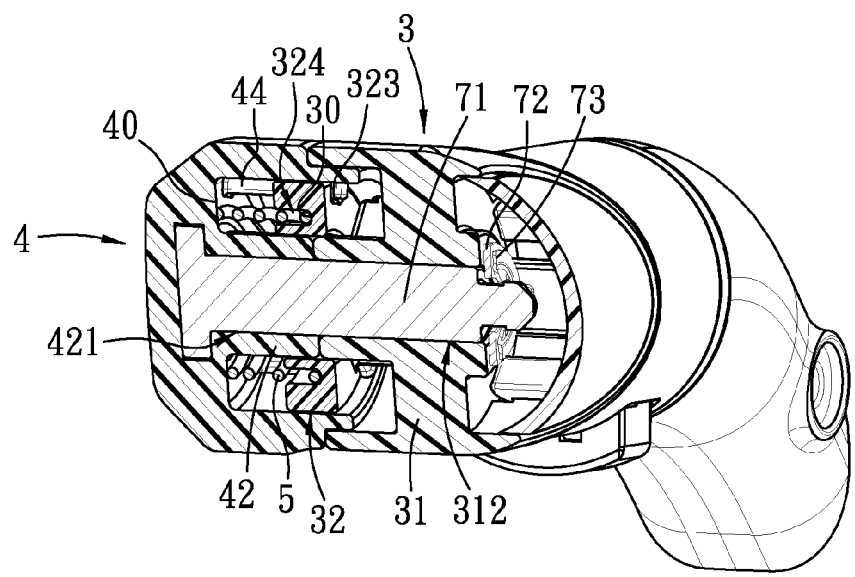
FIG. 7 is a sectional view taken along Line VII-VII in FIG. 1.

Referring to FIGS. 5, 6, and 7, when the wheel 2 moves on a flat road surface, the pressing ring 32 is pushed by the resilient member 5 to move the first spiral surfaces 321 of the pressing ring 32 into contact with the second spiral surfaces 313 of the sleeve 31, respectively. At this time, the pressing ring 32 is spaced apart from the second pressing portion 40 along an axial direction of the annular groove 324 at an appropriate distance.

Figure 8:
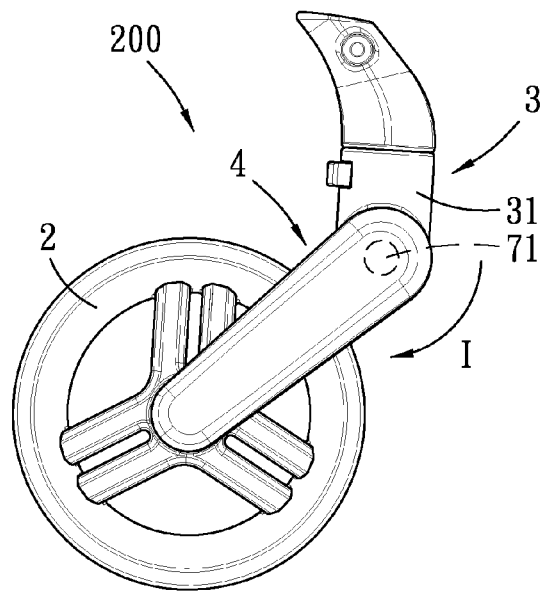
FIG. 8 is a view similar to FIG. 5 but illustrating that a wheel-connecting arm is subjected to a torque when the stroller moves on an uneven road surface.
Figure 9:
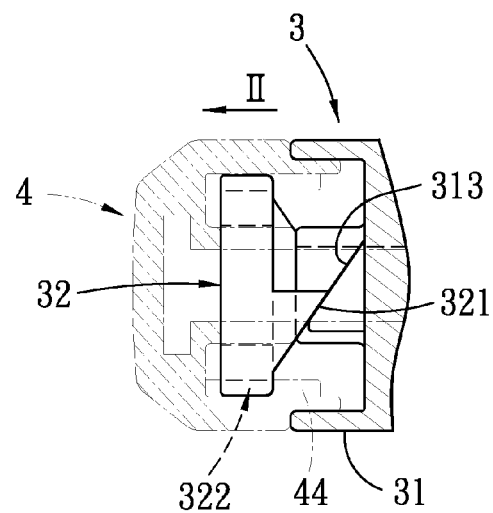
FIG. 9 is a view similar to FIG. 6 but illustrating that the pressing ring is moved toward the second pressing portion when the stroller travels on the uneven road surface.
Figure 10:
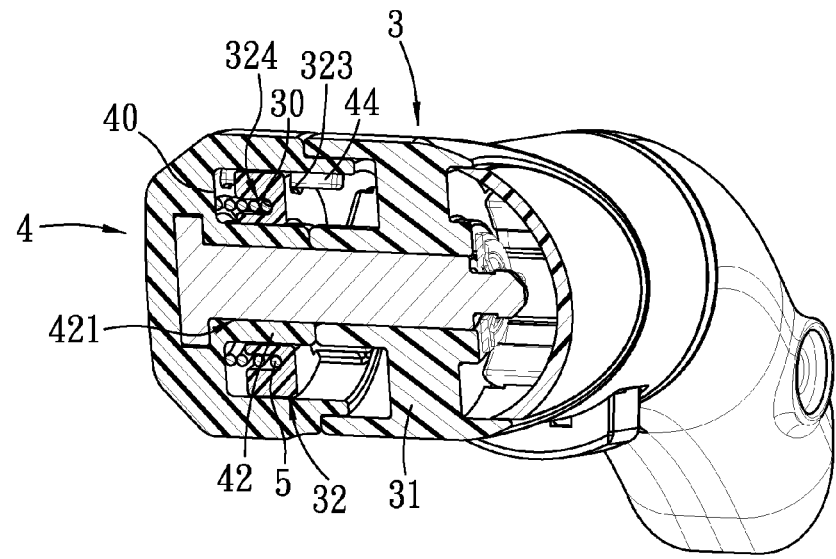
FIG. 10 is a cutaway view of the first preferred embodiment.

Referring to FIGS. 8, 9, and 10, when the wheel 2 moves on an uneven rod surface to undergo vibration, the wheel-connecting arm 4 is driven by the wheel 2 to rotate relative to the sleeve 31 of the frame-connecting member 3 and about the axis of the upper pivot 71 in a direction (I) (see FIG. 8). Hence, rotation of the wheel-connecting arm 4 is transferred to the pressing ring 32 to thereby rotate the first spiral surfaces 321 of the pressing ring 32 relative to the second spiral surfaces 313 of the sleeve 31, so that the second spiral surfaces 313 push the first spiral surfaces 313 to move in a direction (II) (see FIG. 9), thereby moving the pressing ring 32 along a longitudinal direction of the first engaging portions 44. During movement of the pressing ring 32 along the longitudinal direction of the first engaging portions 44, the first pressing portion 30 moves toward the second pressing portion 40 to compress the resilient member 5. Upon such a resilient deformation, the resilient member 5 can absorb shock of the wheel 2 to retard rotation of the wheel 2 and the wheel-connecting arm 4, so as to avoid the stroller frame 1 from jumping due to sudden rapid rotation of an assembly of the wheel 2 and the wheel-connecting arm 4. As such, the resilient member 5 cooperates with the first and second pressing portions 30, 40 to constitute a shock-absorbing mechanism for facilitating smooth movement of the stroller.

Figure 11:
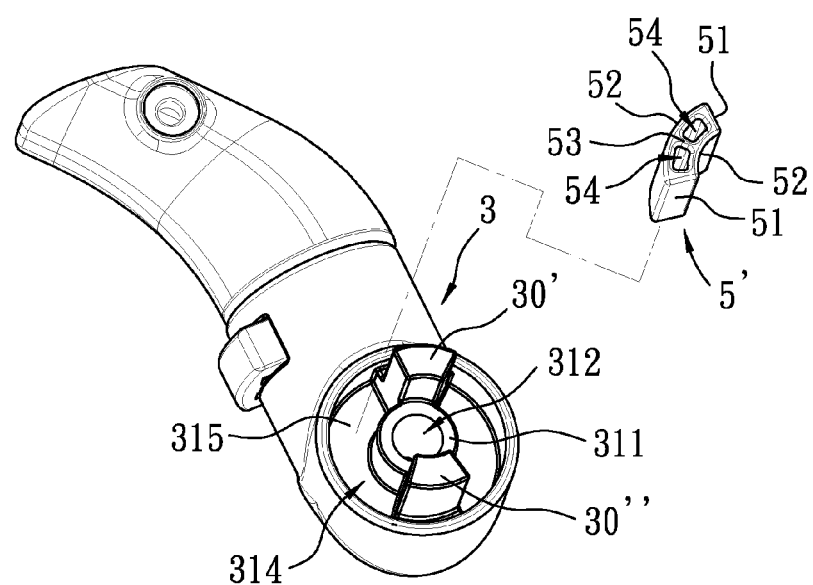
FIG. 11 is a partly exploded perspective view of the second preferred embodiment of a stroller wheel device.
Figure 12:
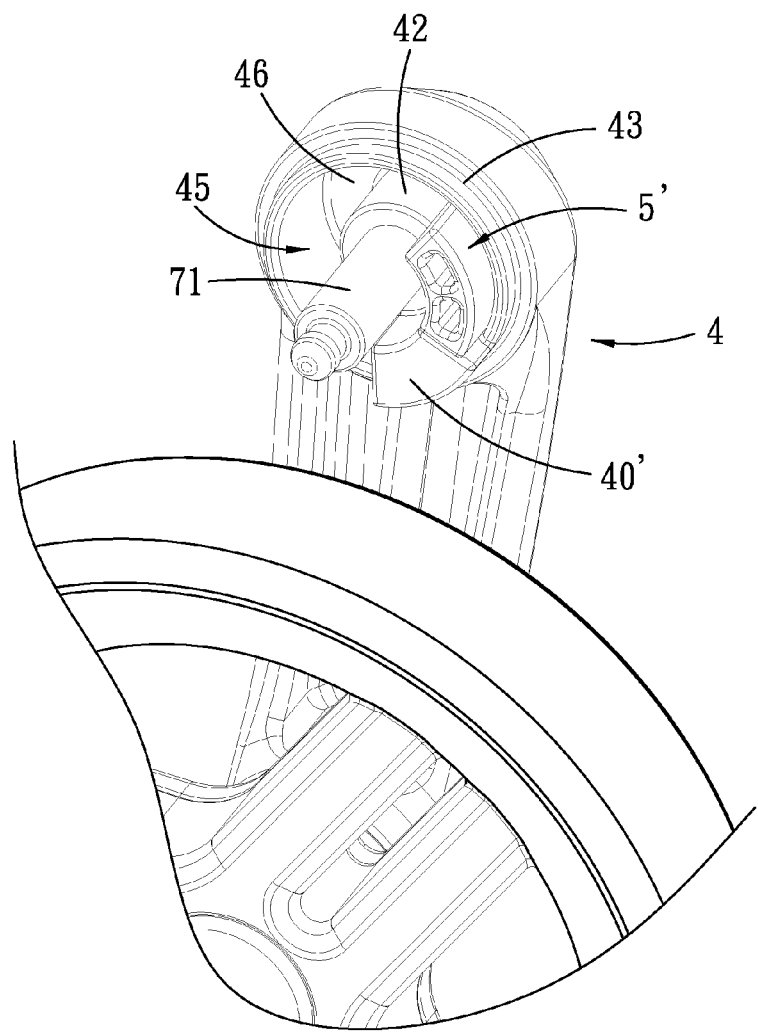
FIG. 12 is a fragmentary perspective view of the second preferred embodiment.
Figure 13:
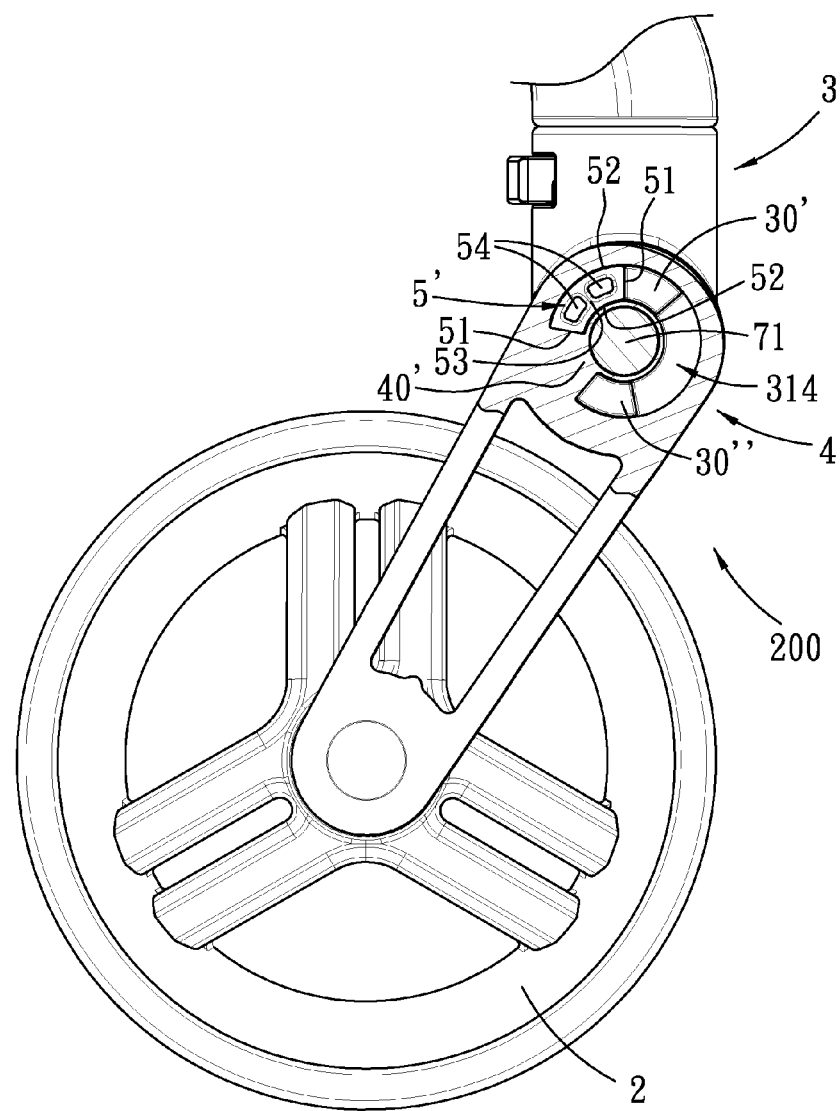
FIG. 13 is a partly sectional side view of the second preferred embodiment.

FIGS. 11, 12, and 13 show the second preferred embodiment of a stroller wheel device 200 according to this invention, which is similar in construction to the first preferred embodiment. The main difference resides in the shock-absorbing mechanism.

In this embodiment, one of the frame-connecting member 3 and the wheel-connecting arm 4 is formed with an annular groove 314, 45. The second pressing portion 40' and the resilient member 5' are disposed within the annular groove 314, 45. The frame-connecting member 3 further includes a third pressing portion 30". The first and third pressing portions 30', 30" are disposed in the annular groove 314, 45, and are spaced apart from and diametrically opposite to each other. The third pressing portion 30" abuts against the second pressing portion 40', so as to limit rotation of the second pressing portion 40' toward the first pressing portion 30' in a direction away from the third pressing portion 30", thereby compressing the resilient member 5'.

In this embodiment, the frame-connecting member 3 is formed with a first annular groove 314, and the wheel-connecting arm 4 is formed with a second annular groove 45 aligned with the first annular groove 314. Each of the first and third pressing portions 30', 30" is a projecting block formed on an end wall of the frame-connecting member 3, and is disposed within the first annular groove 314, and extends from the first annular groove 314 into the second annular groove 45. The second pressing portion 40' is also a projecting block that is formed on an end wall of the wheel-connecting arm 4, that is disposed in the second annular groove 45, and that extends from the second annular groove 45 into the first annular groove 314. The resilient member 5' is an elastomer disposed in the first and second annular grooves 314, 45. As such, the first and second pressing portions 30', 40' are spaced apart from each other along a circumferential direction of each of the first and second annular grooves 314, 45, such that the length of the resilient member 5' and, thus, contact area between the deformed resilient member 5' and each of the first and second pressing portions 30', 40' are increased, thereby promoting the shock-absorbing effect.

The resilient member 5' may be a polyester elastomer, a rubber elastomer, a silicone elastomer, or a spring. In this embodiment, the resilient member 5' is thermoplastic polyester elastomer (such as Hytrel by DuPont). The resilient member 5' is curved, and has two opposite abutting walls 51 abutting respectively against the first and second pressing portions 30', 40', two curved connecting walls 52 connected between the abutting walls, and at least one through hole 54 formed through the resilient member 5' and disposed between the abutting walls 51 and between the connecting walls 52. As such, when the first and second pressing walls 30', 40' push and move the abutting walls 51 toward each other, the through hole 52 can provide a space to allow for deformation of the connecting walls 52.

The resilient member 5' further has a reinforcing wall 53 connected between the connecting walls 52 and spaced apart from the abutting walls 51. In this embodiment, the resilient member 5' has two through holes 54 each disposed between the reinforcing wall 53 and the corresponding abutting wall 51 and between the connecting walls 52. As such, the reinforcing wall 53 can increase the structural strength of the resilient member 5' so as to prevent rapid deformation of the resilient member 5' when compressed.

Figure 14:
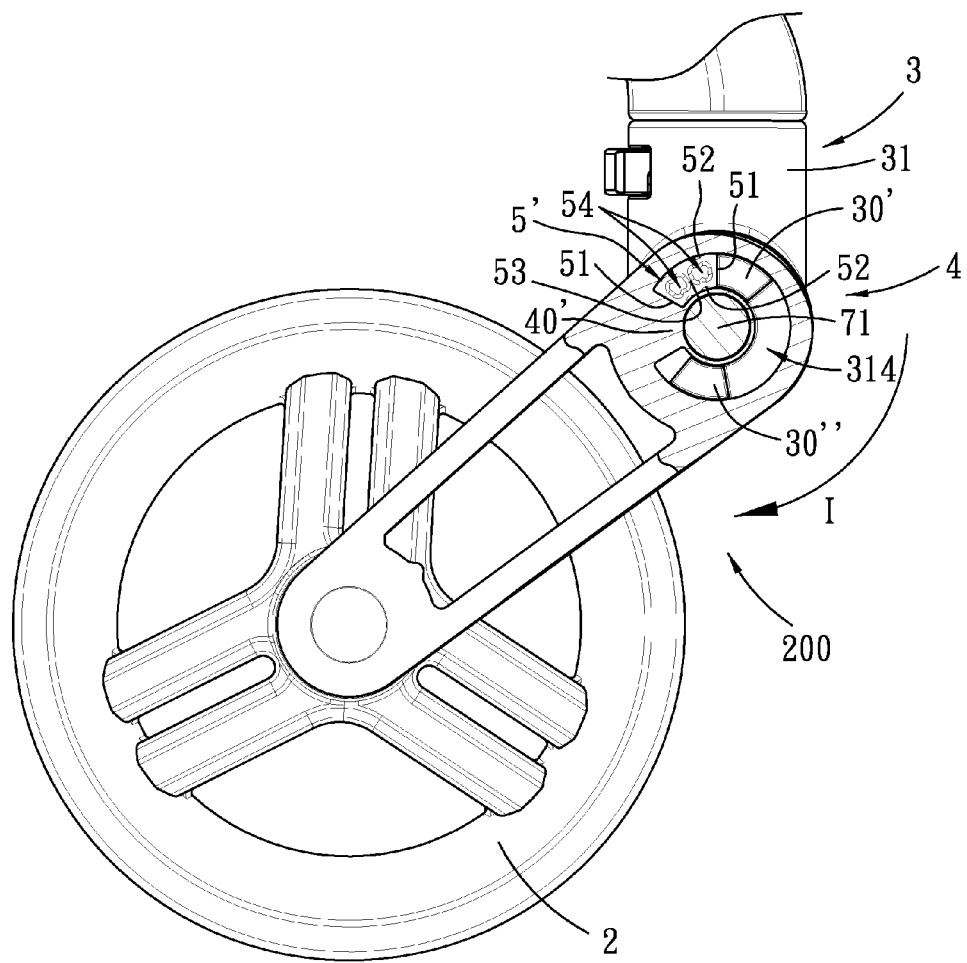
FIG. 14 is a view similar to FIG. 13 but illustrating that a wheel-connecting arm is driven by a wheel to rotate.

With particular reference to FIG. 14, when the wheel 2 moves on an uneven road surface to undergo vibration, the wheel-connecting arm 4 is driven by the wheel 2 to rotate relative to the sleeve 31 of the frame-connecting member 3 and about the axis of the upper pivot 71 in a clockwise direction (I). During clockwise rotation of the wheel-connecting arm 4, the second pressing portion 40' is rotated to press the resilient member 5' against the first pressing portion 30' to thereby compress the resilient member 5'. As a result, the connecting walls 52 are deformed to absorb shock of the wheel 2 so as to facilitate smooth movement of the stroller.

Figure 15:
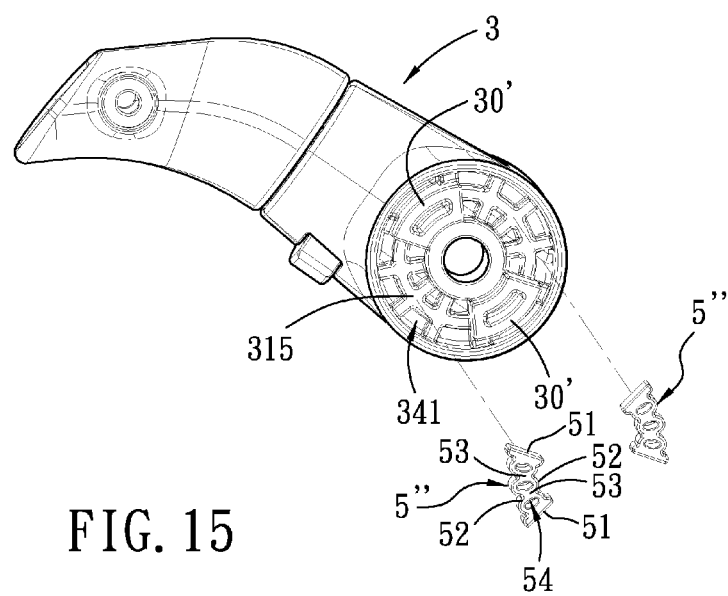
FIG. 15 is a partly exploded perspective view of the third preferred embodiment of a stroller wheel device according to this invention.
Figure 16:
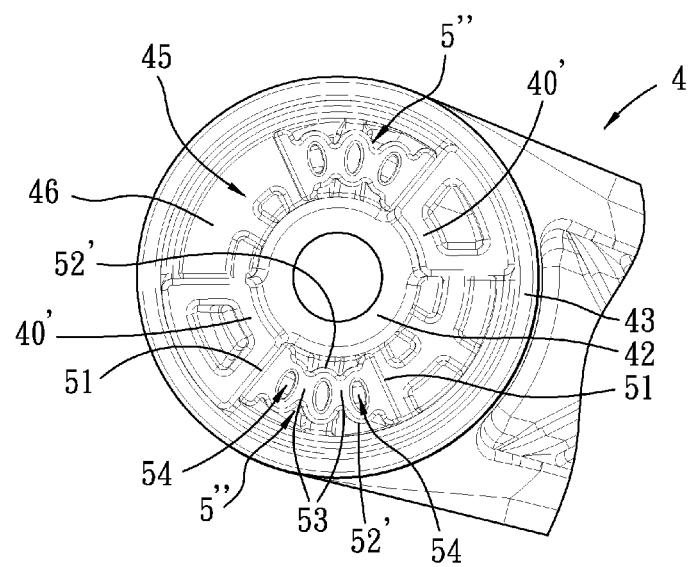
FIG. 16 is a fragmentary side view of the third preferred embodiment.
Figure 17:
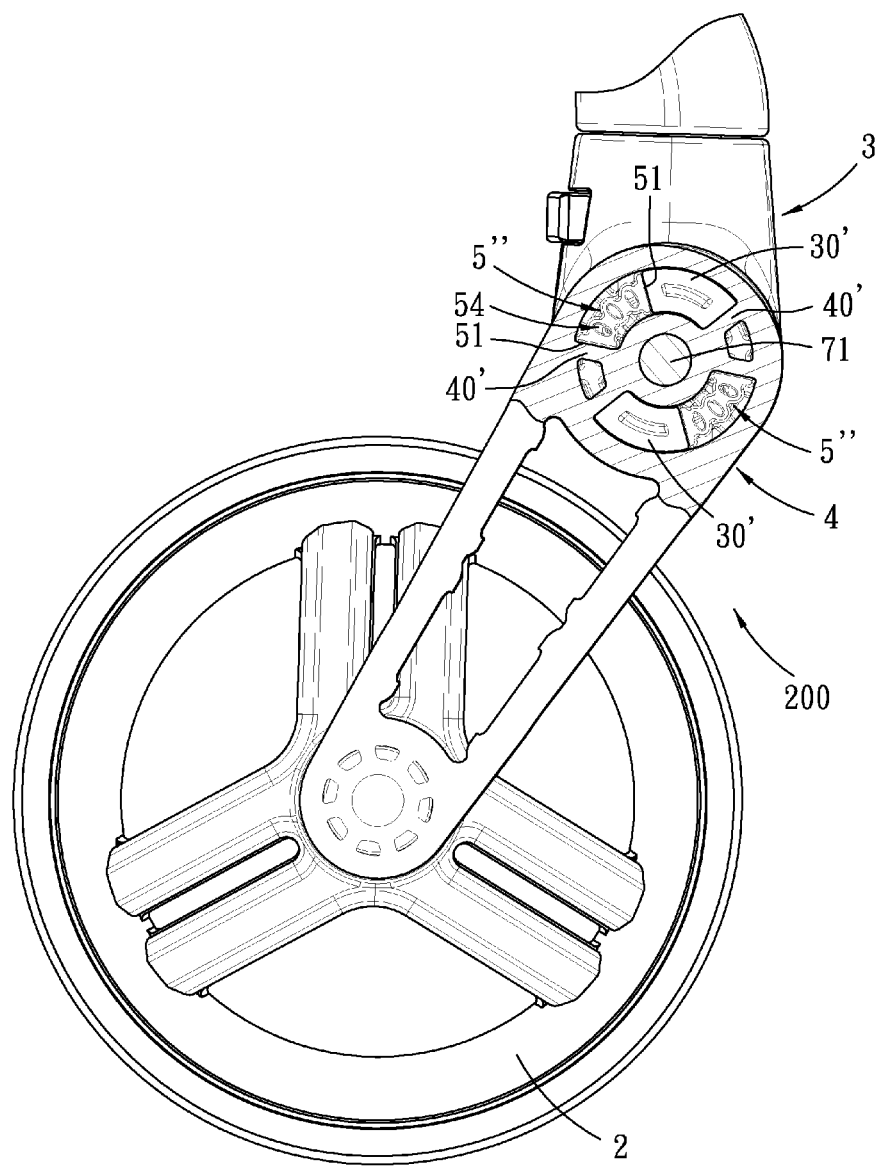
FIG. 17 is a partly sectional side view of the third preferred embodiment.

FIGS. 15, 16, and 17 show the third preferred embodiment of a stroller wheel device 200 according to this invention, which is similar in construction to the second preferred embodiment. The difference is described in the following.

In this embodiment, the wheel-connecting member 3 includes two first pressing portions 30' disposed respectively at positions of the first and third pressing portions 30', 30" (see FIG. 13) of the second preferred embodiment, the wheel-connecting arm 4 includes two second pressing portions 40', and the stroller wheel device 200 includes two resilient members 5" spaced apart from each other. One of the first pressing portions 30' is disposed between and abuts against one of the second pressing portions 40' and one of the resilient members 5". The other of the first pressing portions 30' is disposed between and abuts against the other of the second pressing portions 40' and the other of the resilient members 5".

In this embodiment, each of the resilient members 5" includes two abutting walls 51, two serrated connecting walls 52, two reinforcing walls 53 connected between the connecting walls 52, and three through holes 54 disposed between the connecting walls 52. A middle one of the through holes 54 is disposed between the reinforcing walls 53. Each of the remaining two through holes 54 is disposed between the corresponding abutting wall 51 and the corresponding reinforcing wall 53. The connecting walls 52 of each of the resilient members 5" includes an outer connecting wall 52 abutting against the surrounding wall 43 at two opposite ends thereof and spaced apart from the surrounding wall 43 at the remaining portion thereof, and an inner connecting walls 52 abutting against the projecting rod 42 at two opposite ends thereof and spaced apart from the projecting rod 42 at the remaining portion thereof. Due to the serrated structure of the connecting walls 52, the shock-absorbing effect can be further promoted.

Figure 18:
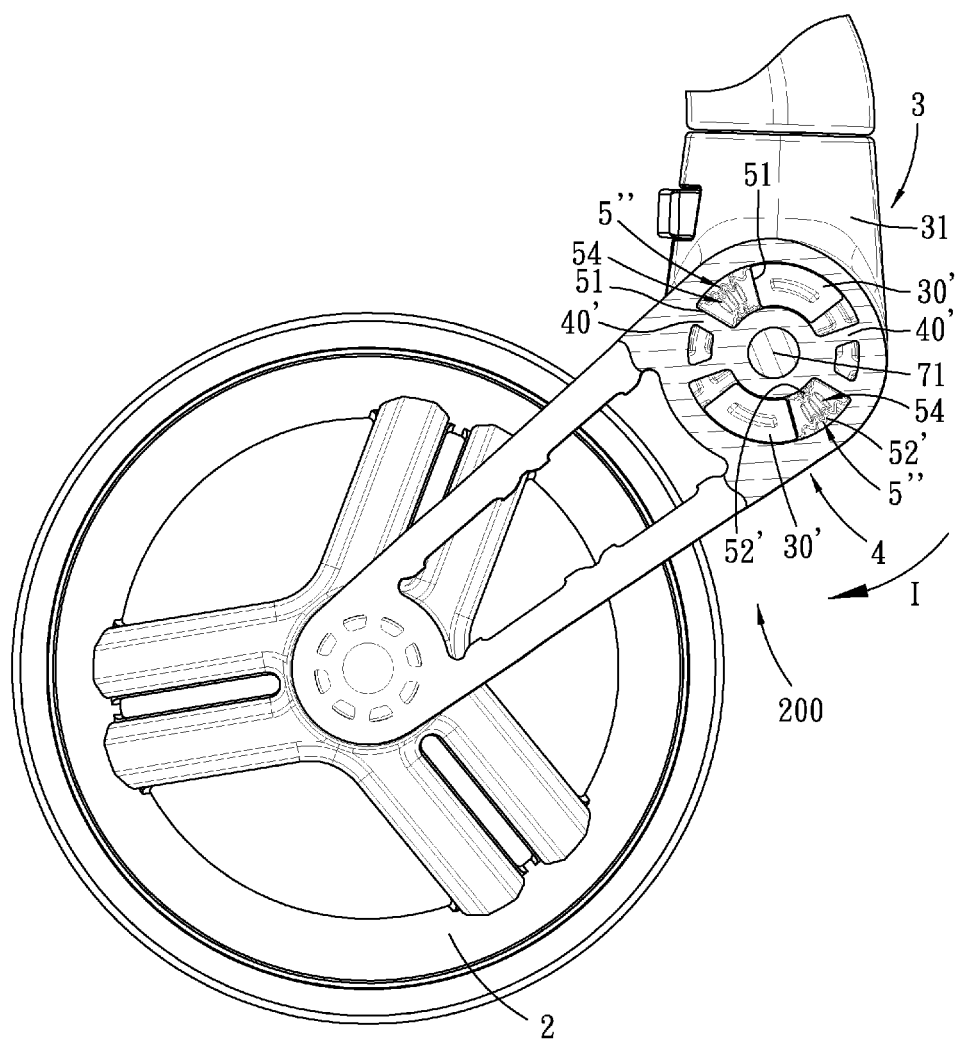
FIG. 18 is a view similar to FIG. 16 but illustrating that a wheel-connecting arm is driven by a wheel to rotate.

With particular reference to FIG. 18, when the wheel 2 moves on an uneven road surface to undergo vibration, the wheel-connecting arm 4 is driven by the wheel 2 to rotate clockwise relative to the sleeve 31 of the frame-connecting member 3 and about the axis of the upper pivot 71 in a direction (I). During clockwise rotation of the wheel-connecting arm 4, the resilient members 5" are pressed respectively against the first pressing portions 30' by the second pressing portions 40', so as to compress the resilient members 5", in such a manner that the abutting walls 51 of each of the resilient members 5" are moved toward each other by the corresponding first pressing portion 30' and the corresponding second pressing portion 40' and that the middle portions of the corresponding two connecting walls 52' are moved respectively toward the surrounding wall 43 and the projecting rod 42. Hence, the width of the through holes 54 becomes smaller. Due to such a resilient deformation of the resilient members 5", shock of the wheel 2 can be absorbed effectively to facilitate smooth movement of the stroller.

In view of the above, each of the resilient members 5, 5', 5" is disposed between and abuts against one first pressing portion 30, 30' and one second pressing portion 40, 40' such that, upon rotation of the wheel-connecting arm 4 relative to the frame-connecting member 3, it is compressed by the first pressing portion 30, 30' and the second pressing portion 40, 40' to absorb shock of the wheel 2, thereby facilitating smooth movement of the stroller. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A stroller wheel device comprising:
   a wheel;
   a frame-connecting member including at least one first pressing portion;
   a wheel-connecting arm including upper and lower ends connected respectively and pivotally to said frame-connecting member and said wheel, and at least one second pressing portion spaced apart from said first pressing portion; and
   a resilient member disposed between and abutting against said first and second pressing portions such that, when said wheel-connecting arm rotates relative to said frame-connecting member, said first and second pressing portions move toward each other to compress said resilient member;
   wherein said frame-connecting member includes a sleeve connected pivotally to said wheel-connecting arm, a pressing ring disposed between said frame-connecting member and said wheel-connecting arm, said pressing ring including said first pressing portion at an end thereof facing said second pressing portion, said pressing ring being connected to said wheel-connecting arm in such a manner to be driven by said wheel-connecting arm to rotate to thereby move toward said second pressing portion.

2. The stroller wheel device as claimed in claim 1, wherein one of an end of said pressing ring opposite to said first pressing portion and an end of said frame-connecting member facing said pressing ring is formed with at least one spiral surface, and the other of said end of said pressing ring opposite to said first pressing portion and said end of said frame-connecting member facing said pressing ring is biased to contact said spiral surface.

3. The stroller wheel device as claimed in claim 1, wherein an end of said pressing ring opposite to said first pressing portion is formed with a first spiral surface, and said frame-connecting member further includes a second spiral surface facing and abutting against said first spiral surface.

4. The stroller wheel device as claimed in claim 1, wherein an end of said pressing ring opposite to said first pressing portion is formed with two diametrically opposed first spiral surfaces, and said frame-connecting member further includes two second spiral surfaces facing and abutting against said first spiral surfaces, respectively.

5. The stroller wheel device as claimed in claim 1, wherein said wheel-connecting arm further includes a first engaging portion, and said pressing ring further includes a second engaging portion that engages said first engaging portion, such that said pressing ring can be driven by said wheel-connecting arm to rotate.

6. The stroller wheel device as claimed in claim 5, wherein said wheel-connecting arm further includes a projecting rod disposed at a central portion of said second pressing portion, and a surrounding wall extending from an outer periphery of said second pressing portion and disposed around said projecting rod, said first engaging portion being configured as a rib extending from an inner wall surface of said surrounding wall and extending in a direction parallel to said projecting rod, said pressing ring being sleeved movably on said projecting rod, said second engaging portion being configured as an engaging groove formed in an outer periphery of said pressing ring, said rib extending through said engaging groove.

7. The stroller wheel device as claimed in claim 1, wherein said resilient member is a compression spring disposed between said pressing ring and said wheel-connecting arm and having two ends abutting respectively against said first and second pressing portions.

8. The stroller wheel device as in claim 1 wherein each of said frame-connecting member and said wheel-connecting arm are connected together with a shaft extending between each of them with said first and second pressing portions and said resilient member mounted coaxially on said shaft.

9. A stroller wheel device comprising:
   a wheel;
   a frame-connecting member including at least one first pressing portion;
   a wheel-connecting arm including upper and lower ends connected respectively and pivotally to said frame-connecting member and said wheel, and at least one second pressing portion spaced apart from said first pressing portion; and
   a resilient member disposed between and abutting against said first and second pressing portions such that, when said wheel-connecting arm rotates relative to said frame-connecting member, said first and second pressing portions move toward each other to compress said resilient member;
   wherein one of said frame-connecting member and said wheel-connecting arm is formed with an annular groove, said second pressing portion and said resilient member being disposed within said annular groove, said frame-connecting member further including a third pressing portion, said first and third pressing portions being disposed in said annular groove and being spaced apart from each other, said third pressing portion abutting against said second pressing portion.

10. The stroller wheel device as claimed in claim 9, wherein said frame-connecting member is formed with a first annular groove, and said wheel-connecting arm is formed with a second annular groove aligned with said first annular groove, each of said first and third pressing portions being a projecting block extending from said first annular groove into said second annular groove, said second pressing portion being a projecting block that is disposed in said second annular groove and that extends from said second annular groove into said first annular groove, said resilient member being an elastomer disposed in said first and second annular grooves.

11. The stroller wheel device as claimed in claim 10, wherein said resilient member has two opposite abutting walls abutting respectively against said first and second pressing portions, two connecting walls connected between said side abutting walls, and at least one through hole formed through said resilient member and disposed between said side abutting walls and between said connecting walls.

12. The stroller wheel device as claimed in claim 11, wherein said resilient member further has a reinforcing wall connected between said connecting walls and spaced apart from said side abutting walls, said resilient member having two said through holes each disposed between said reinforcing wall and a corresponding one of said side abutting walls and between said connecting walls.

13. The stroller wheel device as claimed in claim 9, wherein said resilient member is one of a polyester elastomer, a rubber elastomer, and a silicone elastomer.

14. The stroller wheel device as in claim 9 wherein each of said frame-connecting member and said wheel-connecting arm are connected together with a shaft extending between each of them with said first and second pressing portions and said resilient member mounted around said shaft.

15. A stroller wheel device comprising:
  a wheel;
  a frame-connecting member including at least one first pressing portion;
  a wheel-connecting arm including upper and lower ends connected respectively and pivotally to said frame-connecting member and said wheel, and at least one second pressing portion spaced apart from said first pressing portion; and
  a resilient member disposed between and abutting against said first and second pressing portions such that, when said wheel-connecting arm rotates relative to said frame-connecting member, said first and second pressing portions move toward each other to compress said resilient member;
  wherein one of said frame-connecting member and said wheel-connecting arm is formed with an annular groove, said frame-connecting member including two said first pressing portions disposed in said annular groove and spaced apart from each other, said wheel-connecting arm including two said second pressing portions disposed in said annular groove, one of said first pressing portions being disposed between and abutting against one of said second pressing portions and one of said resilient members, the other of said first pressing portions being disposed between and abutting against the other of said second pressing portions and the other of said resilient members.

16. The stroller wheel device as in claim 15 wherein each of said frame-connecting member and said wheel-connecting arm are connected together with a shaft extending between each of them with said first and second pressing portions and said resilient member mounted around said shaft.

17. A stroller wheel device comprising:
  a wheel;
  a frame-connecting member including a pressing ring at an end thereof having at least one first pressing portion;
  a wheel-connecting arm including upper and lower ends connected respectively and pivotally to said frame-connecting member and said wheel, said upper end of said wheel-connecting arm including at least one second pressing portion spaced apart from, and facing said first pressing portion; and
  a resilient member disposed between and abutting against said first and second pressing portions such that, when said wheel-connecting arm rotates relative to said frame-connecting member, said first and second pressing portions move toward each other to compress said resilient member.

18. The wheel device as claimed in claim 17, wherein said resilient member is disposed between said pressing ring and said wheel-connecting arm.

19. The wheel device as claimed in claim 17, wherein said resilient member is an elastomer.

20. The stroller wheel device as in claim 17 wherein each of said frame-connecting member and said wheel-connecting arm are connected together with a shaft extending between each of them with said first and second pressing portions and said resilient member mounted around said shaft.

21. A stroller wheel device comprising:
  a wheel;
  a frame-connecting member including at least one first pressing portion;
  a wheel-connecting arm including upper and lower ends connected respectively and pivotally to said frame-connecting member and said wheel, said upper end of said wheel-connecting arm including at least one second pressing portion spaced apart from said first pressing portion; and
  a resilient member disposed between and abutting against said first and second pressing portions such that, when said wheel-connecting arm rotates relative to said frame-connecting member, said first and second pressing portions move toward each other to compress said resilient member;
  wherein said upper end of said wheel-connecting arm is formed with an annular groove, said at least one second pressing portion and said resilient member being disposed within said annular groove.

22. The stroller wheel device as in claim 21 wherein each of said frame-connecting member and said wheel-connecting arm are connected together with a shaft extending between each of them with said first and second pressing portions and said resilient member mounted around said shaft.

23. A wheel device comprising:
  a wheel;
  a frame-connecting member including two first pressing portions spaced apart from each other;
  a wheel-connecting arm including upper and lower ends connected respectively and pivotally to said frame-connecting member and said wheel, and two second pressing portions; and
  two resilient members disposed between said frame-connecting member and said wheel-connecting arm;
  wherein one of said first pressing portions is disposed between and abuts against one of said second pressing portions and one of said resilient members, the other of said first pressing portions being disposed between and abutting against the other of said second pressing portions and the other of said resilient members;
  said stroller wheel device further comprises a pivot extending between said frame-connecting member and said wheel-connecting arm for interconnecting said frame-connecting member and said wheel connecting arm, said second pressing portions and said resilient members being disposed around said pivot.

24. The wheel device as claimed in claim 23, wherein each of said resilient members is an elastomer.

* * * * *